United States Patent
You

(10) Patent No.: US 9,225,276 B2
(45) Date of Patent: Dec. 29, 2015

(54) IMAGE FORMING APPARATUS, CONTROL METHOD FOR THE SAME, AND MOTOR STATE DETECTOR

(71) Applicant: Samsung Electronics Co., Ltd., Suwon-si (KR)

(72) Inventor: Yong Ho You, Seoul (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 2 days.

(21) Appl. No.: 14/044,276

(22) Filed: Oct. 2, 2013

(65) Prior Publication Data

US 2014/0139173 A1 May 22, 2014

(30) Foreign Application Priority Data

Nov. 16, 2012 (KR) .................. 10-2012-0130058

(51) Int. Cl.
 *H02P 8/00* (2006.01)
 *H02P 8/38* (2006.01)
 *H02K 11/00* (2006.01)
 *H02P 8/34* (2006.01)

(52) U.S. Cl.
 CPC ............. *H02P 8/38* (2013.01); *H02K 11/001* (2013.01); *H02P 8/34* (2013.01)

(58) Field of Classification Search
 CPC .............. H02P 8/34; H02P 8/38; H02P 8/14; H02P 8/10; H02P 8/12; H02P 8/32; H02K 11/001; G02B 7/28; G03B 3/10; G03G 15/0173; G03G 15/0194; G03G 15/06; G03G 15/5004; G03G 15/5008; G03G 15/502; G03G 15/6529
 USPC ............... 318/685, 611, 599, 811, 476, 696
 See application file for complete search history.

(56) References Cited

U.S. PATENT DOCUMENTS

| | | | | |
|---|---|---|---|---|
| 4,319,174 A * | 3/1982 | Cook et al. | ..................... | 318/696 |
| 5,105,739 A * | 4/1992 | Osawa et al. | ................. | 101/365 |
| 5,424,960 A * | 6/1995 | Watanabe et al. | ............... | 702/41 |
| 5,825,153 A * | 10/1998 | Doyle | ........................... | 318/701 |
| 5,869,944 A * | 2/1999 | Tanina | .......................... | 318/599 |
| 5,897,252 A * | 4/1999 | Kanakubo | ........................ | 400/74 |
| 6,140,792 A * | 10/2000 | Kameyama et al. | .......... | 318/685 |
| 6,212,339 B1 * | 4/2001 | Inoue et al. | ..................... | 399/18 |
| 6,476,578 B2 * | 11/2002 | Yoshikawa et al. | ........... | 318/685 |
| 6,547,462 B1 * | 4/2003 | Yanagi et al. | ................. | 400/283 |
| 6,639,378 B2 * | 10/2003 | Turner et al. | .................. | 318/701 |
| 7,343,235 B2 * | 3/2008 | Isaji et al. | ....................... | 701/45 |
| 7,668,690 B2 * | 2/2010 | Schneider et al. | ............ | 702/145 |

(Continued)

FOREIGN PATENT DOCUMENTS

JP 2007-129811 5/2007

*Primary Examiner* — Paul Ip
(74) *Attorney, Agent, or Firm* — Staas & Halsey LLP

(57) ABSTRACT

An image forming apparatus, a control method for the same, and a motor state detector are provided. An aspect is to detect out-of-step of a motor using only an electric circuit configuration without additional mechanical devices, such as an encoder, a light-emitting device, and a light-receiving device, and to predict and prevent out-of-step of the motor. To this end, the image forming apparatus includes a motor state detector that acquires a current detection signal by detecting phase current of a motor and that generates an output signal in which a duty ratio in a current chopping section of the current detection signal is involved, and a controller that judges a normal state, out-of-step entry, and an out-of-step state of the motor based on the output signal of the motor state detector.

21 Claims, 9 Drawing Sheets

(56) References Cited

U.S. PATENT DOCUMENTS

| | | | |
|---|---|---|---|
| 7,671,510 B2* | 3/2010 | Kawamura et al. | 310/316.01 |
| 7,880,422 B2* | 2/2011 | Tsujimoto et al. | 318/685 |
| 7,907,872 B2* | 3/2011 | Komatsu et al. | 399/167 |
| 8,629,643 B2* | 1/2014 | Tachibana et al. | 318/696 |
| 2006/0108964 A1* | 5/2006 | Shibatani | 318/685 |
| 2006/0152187 A1* | 7/2006 | Harada et al. | 318/685 |
| 2007/0025768 A1* | 2/2007 | Komatsu et al. | 399/167 |
| 2007/0133968 A1* | 6/2007 | Kawamura et al. | 396/79 |
| 2007/0216325 A1* | 9/2007 | Fukamizu et al. | 318/254 |
| 2008/0224639 A1* | 9/2008 | Balsiger | 318/254.1 |
| 2008/0231220 A1* | 9/2008 | Tsujimoto et al. | 318/476 |
| 2009/0224719 A1* | 9/2009 | Shimada | 318/696 |
| 2010/0073700 A1* | 3/2010 | Uematsu | 358/1.13 |
| 2011/0057600 A1* | 3/2011 | Suda | 318/696 |
| 2011/0181215 A1* | 7/2011 | Nakagawara | 318/400.11 |
| 2011/0188163 A1* | 8/2011 | Ando | 361/57 |
| 2011/0229158 A1* | 9/2011 | Yabuki et al. | 399/27 |
| 2011/0229235 A1* | 9/2011 | Tachibana et al. | 399/381 |

* cited by examiner

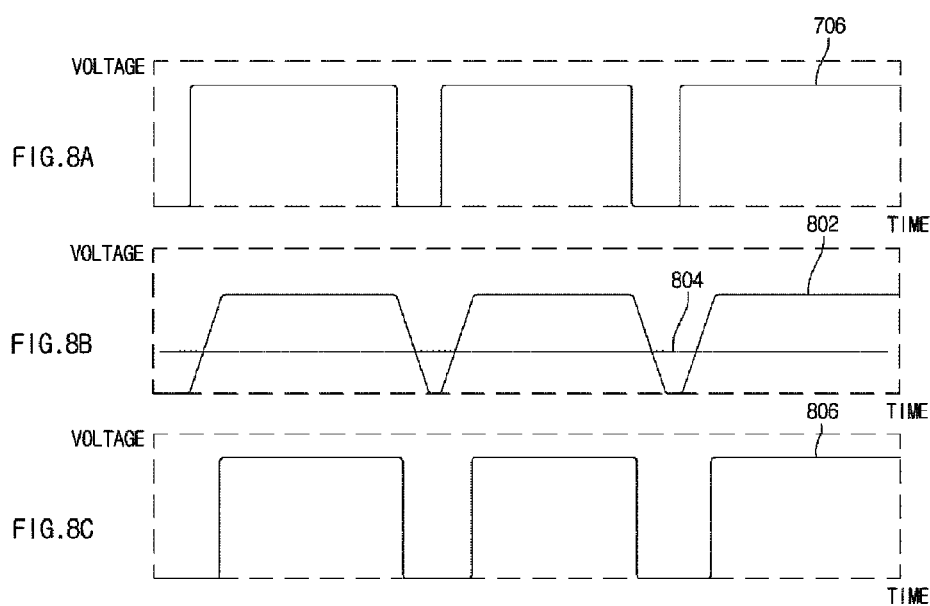

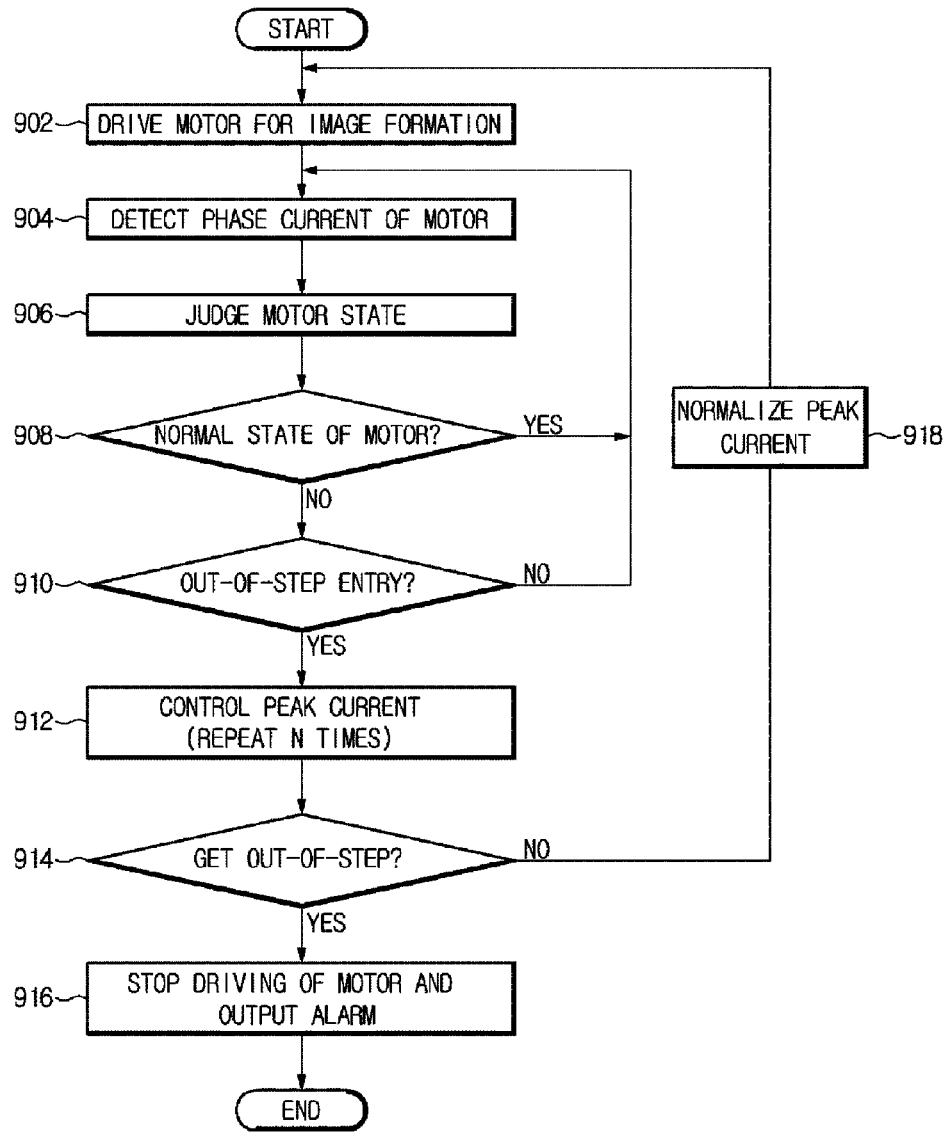

IMAGE FORMING APPARATUS, CONTROL METHOD FOR THE SAME, AND MOTOR STATE DETECTOR

CROSS-REFERENCE TO RELATED APPLICATIONS

This application claims the priority benefit of Korean Patent Applications No. 10-2012-0130058, filed on Nov. 16, 2012 in the Korean Intellectual Property Office, the disclosure of which is incorporated herein by reference.

BACKGROUND

1. Field

Embodiments relate to an image forming apparatus, a control method for the same, and a motor state detector, which serve to detect out-of-step of a motor.

2. Description of the Related Art

A motor is an electric device that generates rotation power using electric energy. Among various shapes and kinds of motors, stepper motors are classified into a constant-voltage type and a constant-current type according to an excitation current control method.

A constant-current type stepper motor is based on current control, in which current applied to a motor coil is detected via a resistor and a switching device to control supply of current is subjected to pulse width modulation control with a constant frequency or constant off-time based on the detected current, whereby the amount of current supplied to the stepper motor may be kept constant.

Although the stepper motor, which is rotated by a predetermined angle according to an input frequency, performs accurate rotation, and therefore does not need feedback for detection of a motor position (revolutions per minute or rotation angle), an encoder to verify the operating state of the stepper motor may be necessary. The encoder, which serves to verify rotation of the stepper motor, may additionally need a slotted rotating disc installed to a rotating shaft of the stepper motor, and moreover a light-emitting element and a light-receiving element may be added to transmit light through a slot of the rotating disc and to receive the transmitted light.

The encoder may increase the price of the stepper motor and the size of the entire stepper motor, and the resulting stepper motor is susceptible to restrictions as to an installation space thereof (that is, a need for a wider space is present).

Further, the encoder type may be impossible to detect when the stepper motor begins to abnormal operate, and therefore may be unable to predict and prevent out-of-step of the stepper motor.

Furthermore, when the stepper motor unintentionally stops, it may be difficult to judge whether the stepper motor stops due to out-of-step, due to an increased device load, or due to control software error.

SUMMARY

In an aspect of one or more embodiments, there is provided a method and apparatus to detect out-of-step of a motor using only an electric circuit configuration without additional mechanical devices, such as an encoder, a light-emitting device, and a light-receiving device, and to predict and prevent out-of-step of the motor.

In an aspect of one or more embodiments, there is provided an image forming apparatus includes a motor state detector that acquires a current detection signal by detecting phase current of a motor and that generates an output signal in which a duty ratio in a current chopping section of the current detection signal is included, and a controller that judges a normal state, out-of-step entry, and an out-of-step state of the motor based on the output signal of the motor state detector.

The controller may judge the normal state of the motor if the duty ratio in the current chopping section of the current detection signal is reduced, may judge out-of-step entry of the motor if the duty ratio in the current chopping section of the current detection signal is increased, and may judge the out-of-step state of the motor if the duty ratio in the current chopping section of the current detection signal maintains a constant value.

The controller may raise peak current of the motor if out-of-step entry of the motor is judged.

The controller may repeatedly raise the peak current of the motor a preset number of times when the motor gets out-of-step.

The controller may output an alarm indicating out-of-step of the motor if the out-of-step state of the motor is judged.

The motor may include a constant-current control type stepper motor.

In an aspect of one or more embodiments, there is provided an image forming apparatus includes a motor, a current detector that detects phase current of the motor and generates a current detection signal representing the detected phase current of the motor, a low-pass filter unit that performs low-pass filtering to convert the current detection signal into a direct-current (DC) voltage level, an analog-to-digital converter that converts the low-pass filtered current detection signal into a digital signal, a masking unit that removes a motor phase-current rising section from the digitized current detection signal and that generates an output signal representing information on the state of the motor in which a duty ratio in a current chopping section of the digitized current detection signal is included, and a controller that judges a normal state, out-of-step entry, and an out-of-step state of the motor based on the output signal of the masking unit.

The low-pass filter unit may include a first low-pass filter that performs low-pass filtering of the current detection signal, an amplifier that amplifies an output signal of the first low-pass filter, and a second low-pass filter that performs additional low-pass filtering of the signal amplified by the amplifier and that outputs the resulting signal to the analog-to-digital converter.

The masking unit may include a first comparator that compares an output of the amplifier of the low-pass filter unit with a preset reference voltage and that outputs a digitized binary signal based on the comparison result, a delay device that delays an output of the first comparator, a second comparator that compares an output of the delay device with a preset reference voltage and that outputs a digitized binary signal based on the comparison result, and a logic device that performs a logic operation of the output signal (e.g., a disjunction or conjunction operation) of the analog-to-digital converter, the output signal of the first comparator, and the output signal of the second comparator, to eliminate a current rising section and output only a signal representing a duty ratio of the current chopping section.

The controller may judge the normal state of the motor if the duty ratio in the current chopping section of the current detection signal is reduced, may judge out-of-step entry of the motor if the duty ratio in the current chopping section of the current detection signal is increased, and may judge the out-of-step state of the motor if the duty ratio in the current chopping section of the current detection signal maintains a constant value.

The controller may raise peak current of the motor if out-of-step entry of the motor is judged.

The controller may repeatedly raise the peak current of the motor a preset number of times when the motor gets out-of-step.

The controller may output an alarm indicating out-of-step of the motor if the out-of-step state of the motor is judged.

The motor may include a constant-current control type stepper motor.

In an aspect of one or more embodiments, there is provided a control method for an image forming apparatus, includes driving a motor, acquiring a current detection signal by detecting phase current of the driving motor, and judging a normal state, out-of-step entry, and an out-of-step state of the motor based on an output signal in which a duty ratio in a current chopping section of the current detection signal is included.

The normal state of the motor may be judged if the duty ratio in the current chopping section of the current detection signal is reduced, out-of-step entry of the motor may be judged if the duty ratio in the current chopping section of the current detection signal is increased, and the out-of-step state of the motor may be judged if the duty ratio in the current chopping section of the current detection signal maintains a constant value.

The control method may further include raising peak current of the motor under control if out-of-step entry of the motor is judged.

The control method may further include repeatedly raising the peak current of the motor a preset number of times under control when the motor gets out-of-step.

The control method may further include outputting an alarm indicating out-of-step of the motor under control if the out-of-step state of the motor is judged.

The motor may include a constant-current control type stepper motor.

In an aspect of one or more embodiments, there is provided a motor state detector includes a current detector that detects phase current of a motor and generates a current detection signal representing the detected phase current of the motor, a low-pass filter unit that performs low-pass filtering to convert the current detection signal into a direct-current (DC) voltage level, an analog-to-digital converter that converts the low-pass filtered current detection signal into a digital signal, and a masking unit that removes a motor phase-current rising section from the digitized current detection signal and that generates an output signal representing information on the state of the motor in which a duty ratio in a current chopping section of the digitized current detection signal is included.

The low-pass filter unit may include a first low-pass filter that performs low-pass filtering of the current detection signal, an amplifier that amplifies an output signal of the first low-pass filter, and a second low-pass filter that performs additional low-pass filtering of the signal amplified by the amplifier and that outputs the resulting signal to the analog-to-digital converter.

The masking unit may include a first comparator that compares an output of the amplifier of the low-pass filter unit with a preset reference voltage and that outputs a digitized binary signal based on the comparison result, a delay device that delays an output of the first comparator, a second comparator that compares an output of the delay device with a preset reference voltage and that outputs a digitized binary signal based on the comparison result, and a logic device that performs a logic operation of the output signal (e.g., a disjunction or conjunction operation) of the analog-to-digital converter, the output signal of the first comparator, and the output signal of the second comparator, to eliminate a current rising section and output only a signal representing a duty ratio of the current chopping section.

The motor may include a constant-current control type stepper motor.

In an aspect of one or more embodiments, there is provided an image forming apparatus includes a motor; a current detector that detects phase current of the motor and generates a current detection signal representing the detected phase current of the motor; a masking unit that removes a motor phase-current rising section from the current detection signal and that generates an output signal representing information on the state of the motor in which a duty ratio in a current chopping section of the digitized current detection signal is included; and a controller that judges a normal state, out-of-step entry, and an out-of-step state of the motor based on the output signal of the masking unit.

In an aspect of one or more embodiments, there is provided a motor state detector including a current detector that detects phase current of a motor and generates a current detection signal representing the detected phase current of the motor; and a masking unit that removes a motor phase-current rising section from the current detection signal and that generates an output signal representing information on the state of the motor in which a duty ratio in a current chopping section of the digitized current detection signal is included.

BRIEF DESCRIPTION OF THE DRAWINGS

These and/or other aspects will become apparent and more readily appreciated from the following description of embodiments, taken in conjunction with the accompanying drawings of which:

FIGS. 8A through 8C are views showing secondary masking (trailing end masking) to remove a high level region of the current rising section; and FIG. 9 is a view showing a motor control method for an image forming apparatus according to an embodiment.

DETAILED DESCRIPTION

Figure 1:
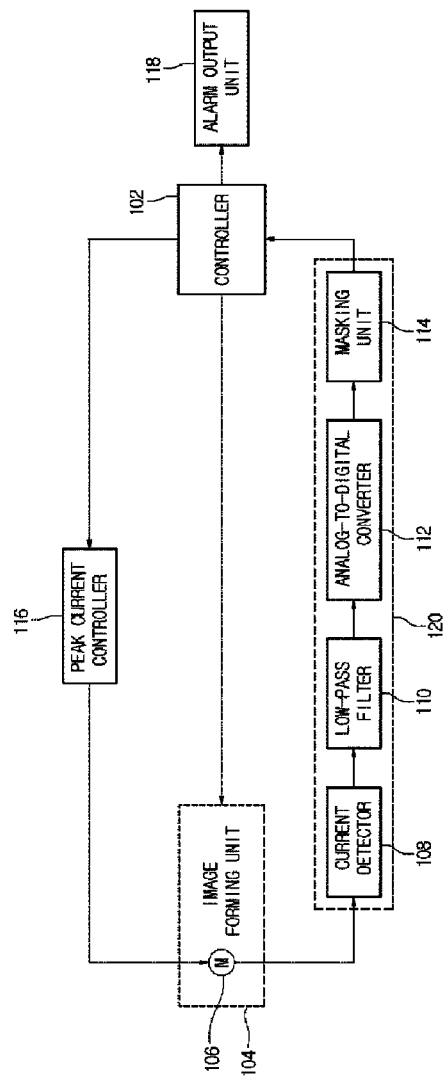
FIG. 1 is a view showing a motor control system of an image forming apparatus according to an embodiment.

Reference will now be made in detail to embodiments, examples of which are illustrated in the accompanying drawings, wherein like reference numerals refer to like elements throughout.

FIG. 1 is a view showing a motor control system of an image forming apparatus according to an embodiment. As exemplarily shown in FIG. 1, a controller 102, which controls general operations of the image forming apparatus, controls an image forming unit 104 to form a target image on paper. The image forming unit 104 includes at least one motor 106 for image formation. Examples of the motor 106 for image formation may include a motor for paper supply, a motor to drive a developer roller and a toner supply roller of a developer unit, and a motor to drive a transfer roller of a transfer unit. The controller 102 receives information on the state of the motor 106, which is generated by a motor state detector (or motor state detection device) 120. The motor state detector 120 includes a current detector 108, a low-pass filter unit 110, an analog-to-digital converter 112, and a masking unit 114. Information on the state of the motor 106 includes a normal state, out-of-step entry, and an out-of-step state. If it is detected that the motor 106 gets out-of-step, the controller 102 controls a peak current controller 116 to raise a peak current of the motor 106 so as to acquire an additional load margin. In addition, the controller 102 controls an alarm output unit 118 to output an alarm when detecting out-of-step of the motor 106, thereby informing a user and a system of out-of-step of the motor 106.

Figure 2:
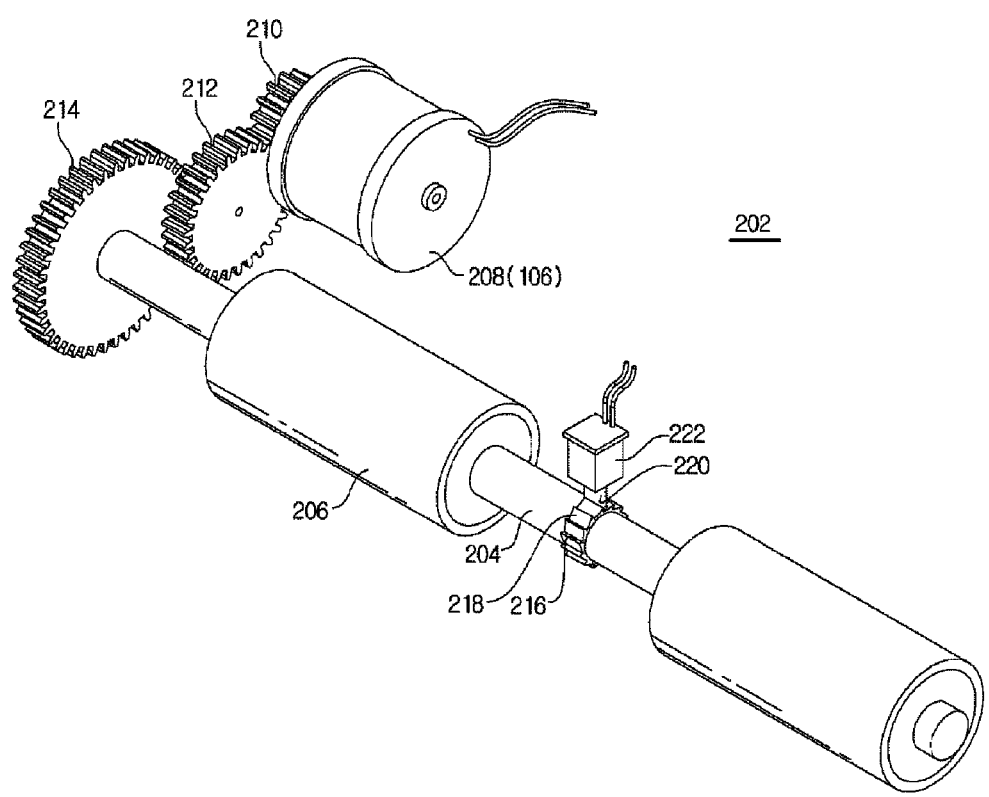
FIG. 2 is a view showing a use example of a motor included in an image forming apparatus according to an embodiment.

FIG. 2 is a view showing a use example of the motor included in the image forming apparatus according to an embodiment. As exemplarily shown in FIG. 2, a paper feed device 202, which is involved in the supply of paper in the image forming apparatus, includes a rotating shaft 204 mounted on a frame of the image forming apparatus, one or more feed rollers 206 inserted on the rotating shaft 204, and a motor 208 to drive the feed rollers 206. The motor 208 may be the motor 106 as exemplarily shown in FIG. 1. In addition, the motor 208 may be a stepper motor, and may be a Direct-Current (DC) motor as necessary. An idle gear 212 is engaged with a rotating pinion 210 of the motor 208, and a rotating gear 214 axially coupled to the rotating shaft 204 is engaged with the idle gear 212. As such, rotation power of the motor 208 is transmitted to the feed rollers 206 through the rotating pinion 210, the idle gear 212, and the rotating gear 214, and the supply of paper is achieved by rotation of the feed rollers 206. A separate latch gear 216 is mounted on the circumference of the rotating shaft 204, and a driver 220 of a solenoid 222 is separably fitted between teeth 218 of the latch gear 216.

Figure 3:
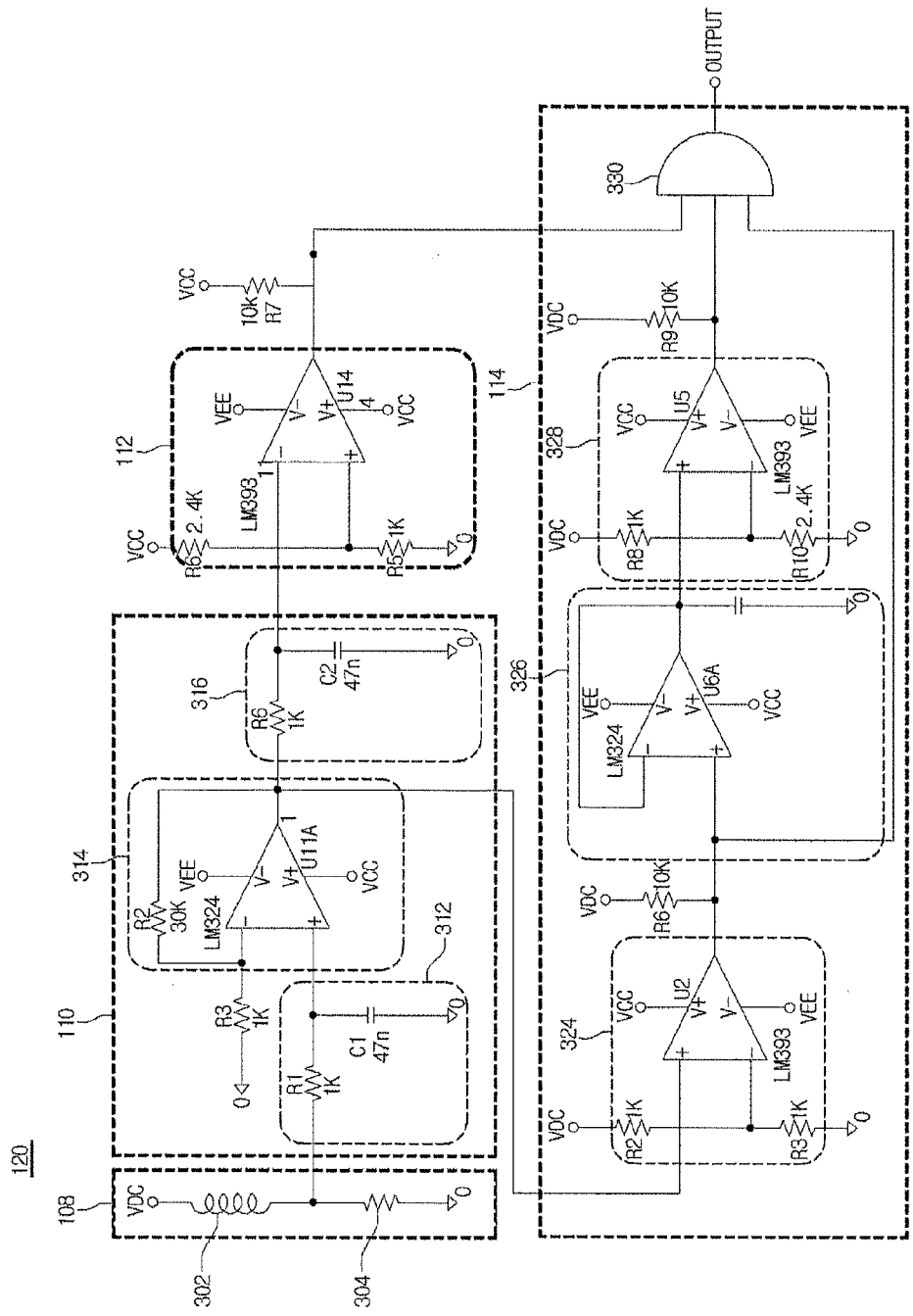
FIG. 3 is a circuit diagram of a motor state detector shown in FIG. 1.
Figure 6:
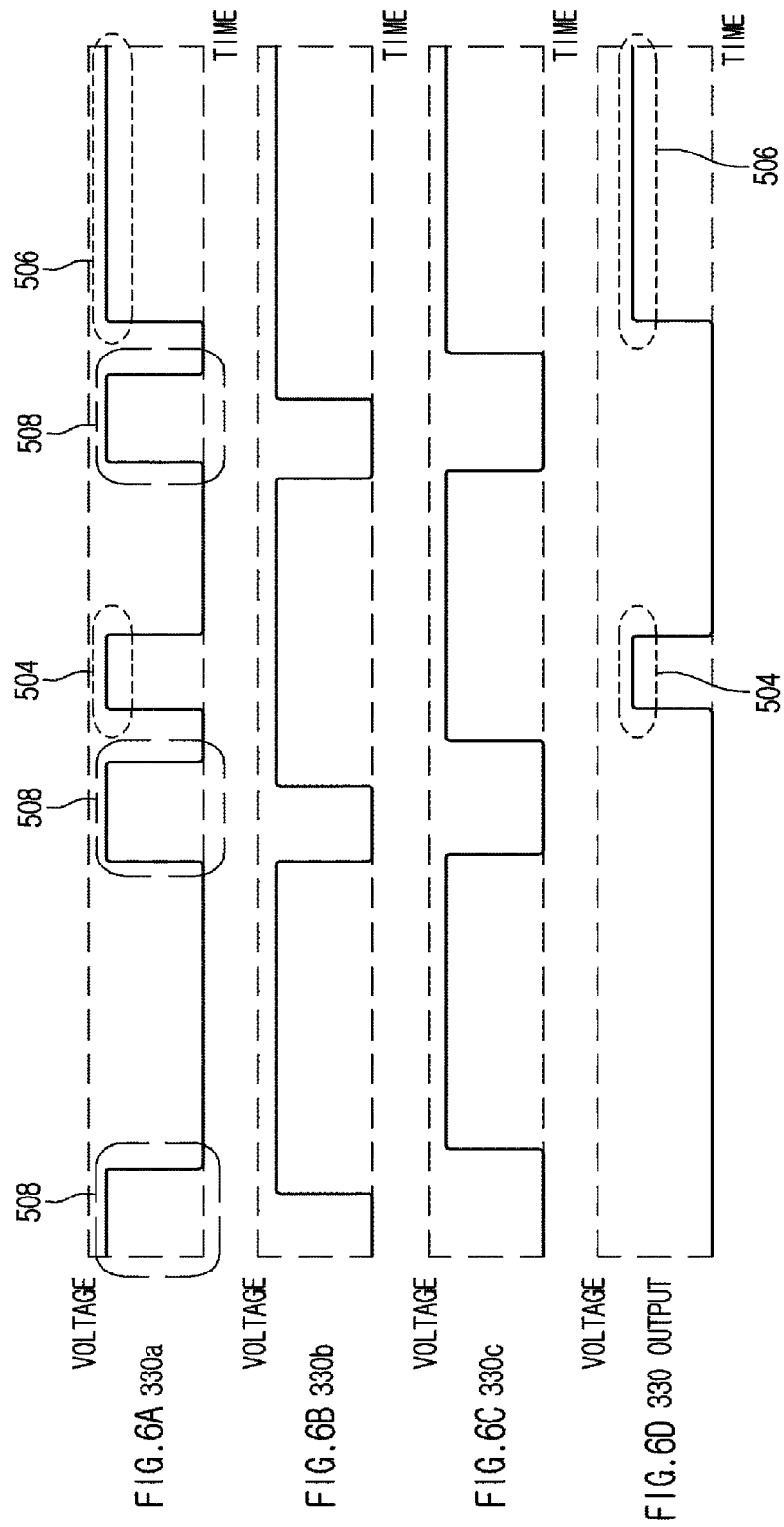
FIGS. 6A through 6D are views showing hardware masking of a current rising section.

FIG. 3 is a circuit diagram of the motor state detector shown in FIG. 1. In FIG. 3, the current detector 108 detects variation of phase current depending on the operating state of the motor 106. The current detector 108 is basically configured in such a way that a resistor 304 is connected in series to a coil 302 of the motor 106, and a voltage proportional to the magnitude of current applied to the resistor 304 (i.e. phase current applied to the coil 302 of the motor 106) appears at both ends of the resistor 304. In an embodiment, a signal depending on the voltage that appears at both ends of the resistor 304 is a current detection signal. The low-pass filter unit 110 converts a duty ratio difference of a pulse width modulation signal, which occurs in a current chopping section of the current detection signal, into an analog DC voltage level difference. The low-pass filter unit 110 includes a first low-pass filter 312, an amplifier 314, and a second low-pass filter 316. The analog-to-digital converter 112 converts a DC voltage value provided by the low-pass filter unit 110 into a digital value to thereby output the digital value for distinction of a normal state and an out-of-step state of the motor 106. The masking unit 114 performs masking removal of the remaining section (for example, a current rising section) of the current detection signal except for the current chopping section. The masking unit 114 includes a first comparator 324, a delay device 326, and a second comparator 328. An output of the first low-pass filter 312 of the low-pass filter unit 110 is amplified by the amplifier 314 and is input to the first comparator 324. The first comparator 324 compares the received output of the amplifier 314 of the low-pass filter unit 110 with a preset reference voltage, and outputs a binary signal (high or low) digitized according to the comparison result (magnitude). An output of the first comparator 324 is delayed for a predetermined time by the delay device 326. An output of the delay device 326 is input to the second comparator 328. The second comparator 328 compares the received output of the delay device 326 of the masking unit 114 with a preset reference voltage, and outputs a binary signal (high or low) digitized according to the comparison result (magnitude). The output of the first comparator 324 is the result of primary masking, and the output of the second comparator 328 is the result of secondary masking. A 3-input And-gate 330 having three inputs provided at the output side of the masking unit 328 receives input signals as follows. An output of the analog-to-digital converter 112 is a first input 330a of the And-gate 330, an output of the first comparator 324 of the masking unit 114 is a second input 330b of the And-gate 330, and an output of the second comparator 328 of the masking unit 114 is a third input 330c of the And-gate 330. The And-gate 330 performs masking removal of the remaining section (for example, current rising section) of the current detection signal except for the current chopping section. This will hereinafter be described in more detail with reference to FIG. 6.

FIGS. 4A through 4C showing the current detection signal and back electromotive force that represent the state of the motor. FIG. 4A shows a waveform 402 of the current detection signal when the motor 106 is normally operated without out-of-step. FIG. 4B shows a waveform 406 of the current detection signal upon out-of-step entry of the motor 106. FIG. 4C shows a waveform 410 of the current detection signal in the out-of-step state of the motor 106. In addition, reference numerals 404, 408, and 412 respectively denote waveforms of back electromotive force of the motor 106 in the respective cases.

A detected current Io of the motor 106 may be represented by a difference between a supply current Ii of the coil 302 and a back electromotive force Ie of the coil 302 (Io=Ii−Ie). In an embodiment, the back electromotive force Ie is generated backward of the supply current by inductance of the coil 302. The supply current Ii is determined by resistance and varies under control, whereas the back electromotive force Ie is proportional to a rotation speed of the motor 302 and periodically exhibits sinusoidal variation. In a constant-current control method, if the back electromotive force Ie is great, the supply current Ii may be greatly reduced, and therefore it may be necessary to increase the supply current Ii of the motor 302. Alternatively, if the back electromotive force Ie is small, it may be necessary to reduce the supply current Ii of the motor 302.

Figure 4:
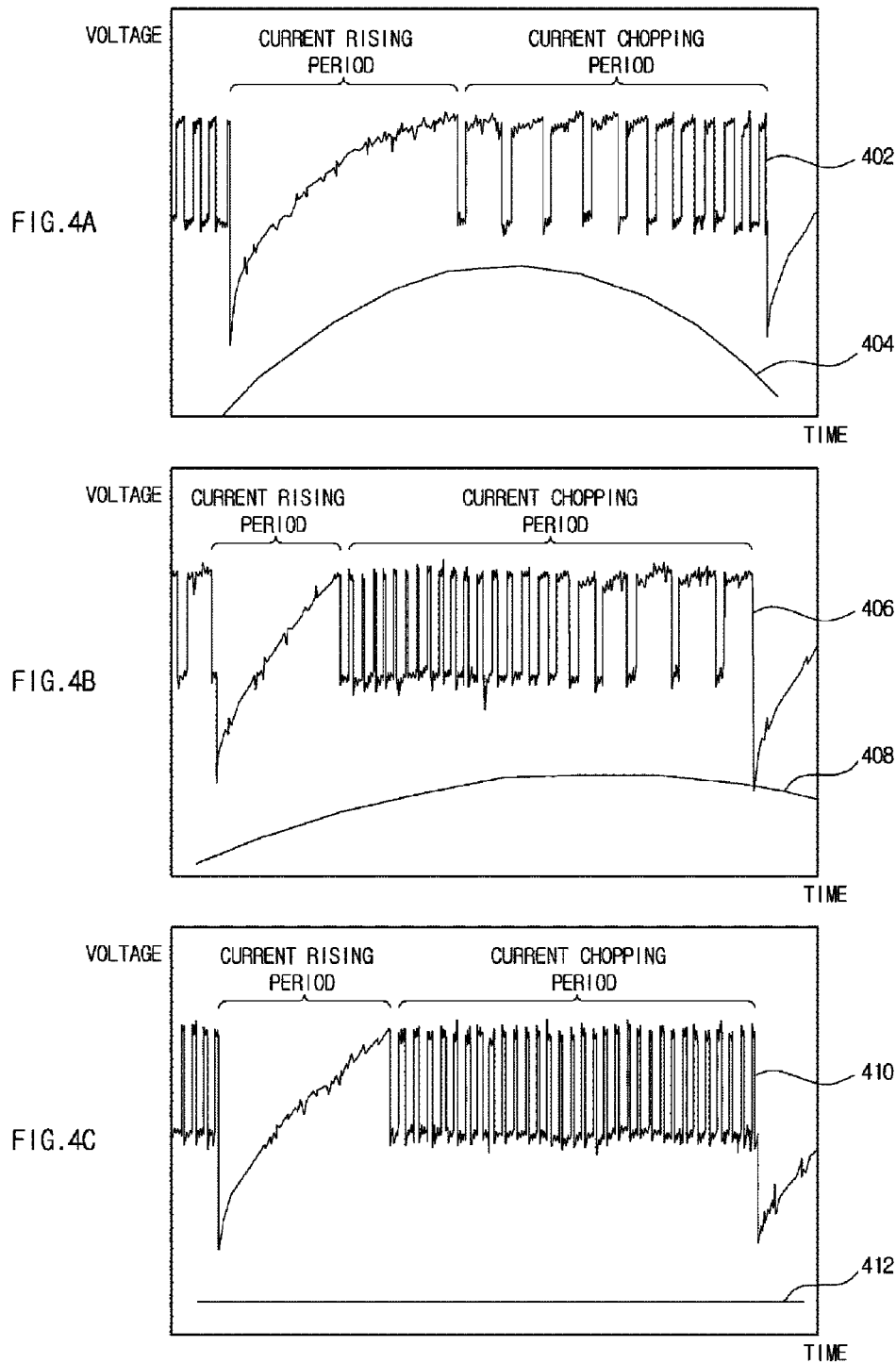
FIGS. 4A through 4C are waveform diagrams showing a current detection signal and back electromotive force that represent the state of a motor.

Considering only the current chopping section of the waveform after reached a peak current in the normal state as exemplarily shown in FIG. 4A, it will be appreciated that the back electromotive force Ie of the chopping section varies from a great value to a small value, and the supply current Ii varies from a great value to a small value according to the reduction of the back electromotive force Ie in order to maintain a constant magnitude. Thereby, a duty ratio of the current detection signal of the supply current Ii also varies from a great value to a small value after the current rising section. Considering the waveform upon out-of-step entry as exemplarily shown in FIG. 4B, a control step applied immediately before out-of-step of the motor 106 becomes differ from an actual rotation angle of the motor 106. As an actual rotation speed of the motor 106 begins to slow, the back electromotive force Ie of the current chopping section after reached a peak current varies from a small value to a great value, but is reduced in the entire magnitude. Therefore, upon out-of-step entry of the motor 106, the duty ratio of the current detection signal varies from a small value to a great value in the current chopping section after the current rising section. Considering the waveform in the out-of-step state as exemplarily shown in FIG. 4C, if the motor 106 stops in a state in which current is supplied to the coil 302 of the motor 106, the back electromotive force Ie becomes zero, and a turn-on time of the supply current Ii for constant-current control becomes the smallest value as compared with that in rotation of the motor 106. Accordingly, the current rising section of the current detection signal of the motor 106 is shortened, and the duty ratio of the current chopping section becomes the minimum as compared to other states of the motor 106. As exemplarily shown in FIG. 4, it may be possible to distinguish the normal state, out-of-step entry, and out-of-step state of the motor 106 from one another based on the length of the current rising section of the current detection signal and the duty ratio of the current chopping section. That is, with regard to the duty ratio of the current chopping section, i) the normal state is judged if the duty ratio is reduced, ii) out-of-step entry is judged if the duty ratio is increased, and iii) the out-of-step state is judged if the duty ratio is kept at the minimum.

FIGS. 5A through 5D are views showing conversion of the detected current of the motor to a DC voltage. FIG. 5A shows the waveform of the current detection signal in the normal state, out-of-step entry, and out-of-step state. FIG. 5B shows the waveform of the signal of FIG. 5A passed through the first low-pass filter 312 of the low-pass filter unit 110 and amplified by the amplifier 314. FIG. 5C shows the waveform of the signal of FIG. B passed through the second low-pass filter 316 of the low-pass filter unit 110. A duty ratio difference of the PWM signal may be converted into a DC voltage level difference by the low-pass filter unit. The DC voltage level may be increased as the duty ratio is increased, and may be reduced as the duty ratio is reduced.

As exemplarily shown in FIG. 5C, the current chopping section of the current detection signal (having passed through the second low-pass filter 316) has different DC voltage levels in the normal state, out-of-step entry, and out-of-step state. The DC voltage level exceeds a predetermined level in the normal state, becomes less than the predetermined level in a partial section upon out-of-step entry, and is kept at the predetermined level or less in the out-of-step state. In an embodiment, the predetermined level is a reference input level of a comparator of the digital-to-analog converter 112.

Figure 5:
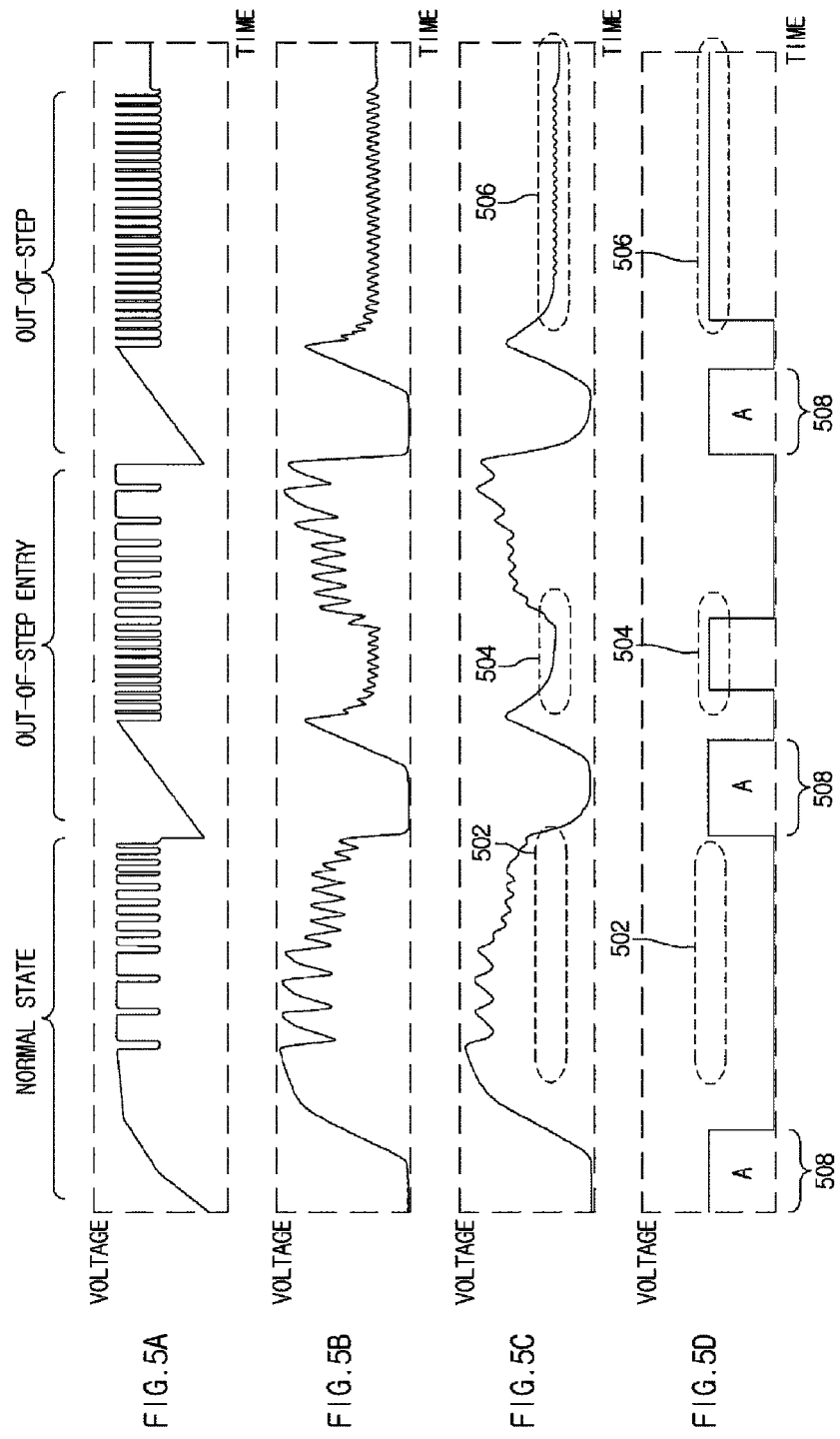
FIGS. 5A through 5D are views showing conversion of detected motor current to direct-current voltage.

When digitizing the analog DC signal exemplarily shown in FIG. 5C via the analog-to-digital converter 112, a digital DC signal as exemplarily shown in FIG. 5D may be acquired. As will be appreciated from (D) of FIG. 5, a region of the analog DC signal exemplarily shown in FIG. 5C, the voltage level of which is a predetermined level or less, is converted into a high level region of the digital DC signal, and a region of the analog DC signal, the voltage level of which exceeds the predetermined level, is converted into a low level region of the digital DC signal (because the predetermined level is a reference input level of the comparator of the analog-to-digital converter 112).

As described above, the digital DC signal output from the low-pass filter unit 110 has the following features in each of the current rising section and the current chopping section. That is, the digital DC signal has a high level region in the current rising section. With regard to the current chopping section, the digital DC signal has a low level region in the normal state, partially has a high level region upon out-of-step entry, and maintains a high level region in the out-of-step state. Since the signal exemplarily shown in FIG. 5D has a low level region 502 representing the normal state of the motor 106, a high level region 504 representing out-of-step entry, a high level region 506 representing the out-of-step state of the motor 106, as well as a high level region 508 in the current rising section, it may be necessary to judge whether the high voltage level is caused by out-of-step entry or the out-of-step state of the motor 106, or is the high voltage level with regard to the current rising section. Accordingly, once the high level region 508 with regard to the current rising section is removed from the signal of FIG. 5D, it may be possible to detect the normal state, out-of-step entry, and the out-of-step state of the motor 106 using only the high/low level information in the remaining section of the digital DC signal. That is, the normal state of the motor 106 may be judged if the entire signal has the low level region 502, out-of-step entry may be judged if the signal partially has the high level region 504, and the out-of-step state of the motor 106 may be judged if the entire signal has the high level region 508.

FIGS. 6A through 6D showing hardware masking of the current rising section. As described above with regard to the signal of FIG. 5D, it may be necessary to judge whether the high level region is caused by out-of-step entry or the out-of-step state of the motor 106, or is the high voltage level with regard to the current rising section because the signal exemplarily shown in FIG. 5D has the high level region 502 representing the normal state of the motor 106, the high level region 504 representing out-of-step entry, the high level region 506 representing the out-of-step state of the motor 106, as well as the high level region 508 in the current rising section. Hardware masking of FIGS. 6A through 6D serves to retain only information required to judge the normal state, out-of-step entry, and the out-of-step state of the motor 106 based on the duty ratio in the current chopping section by removing the high level region in the current rising section. That is, the hardware masking of FIGS. 6A through 6D serves to remove the high level region 508 in the current rising section. As mentioned above with reference to FIG. 3, the first input 330a of the And-gate 330 is the output of the analog-to-digital converter 112, the second input 330b of the And-gate 330 is the output of the first comparator 324 of the masking unit 114, and the third input 330c of the And-gate 330 is the output of the second comparator 328 of the masking unit 114. It will be appreciated that the AND operation of the three input signals of the And-gate 330 remains only the high level region 504 representing out-of-step entry and the high level region 506 representing the out-of-step state, and removes the high level region 508 in the current rising section.

Figure 7:
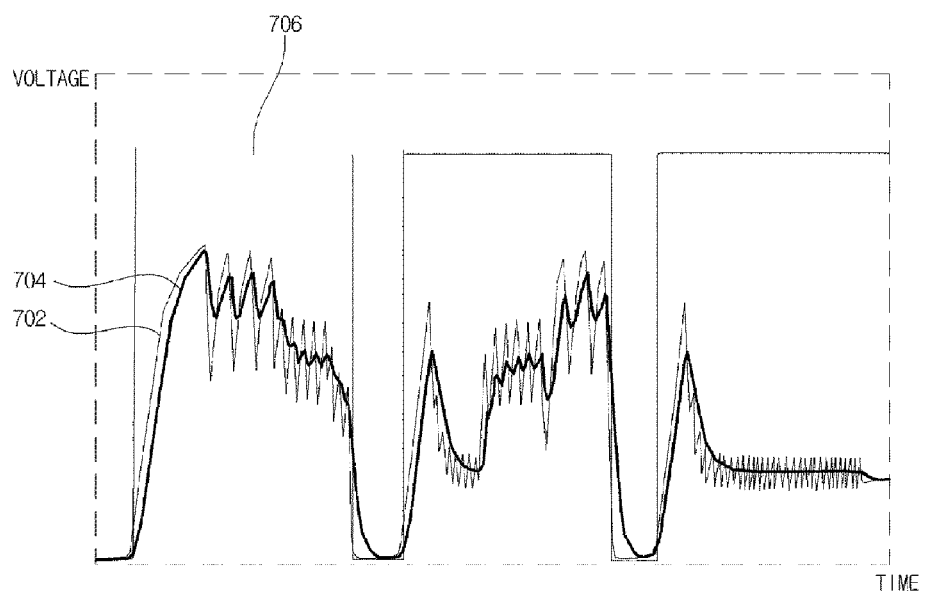
FIG. 7 is a view showing primary masking (leading end masking) to remove a high level region of the current rising section.

FIGS. 7 and 8A-8C are views showing masking to remove the high level region in the current rising section. FIG. 7 is a view showing primary masking (leading end masking), and FIG. 8 is a view showing secondary masking (trailing end masking). It may be necessary to mask a leading end and a trailing end of a square wave signal included in the digitized output signal of the analog-to-digital converter 112 in order to remove the entire high level region 508 in the current rising section. Masking of each of the trailing end and the leading end of the square wave signal included in the digitized output signal of the analog-to-digital converter 112 may be accomplished using a falling time difference of the first low-pass filter 312 and the second low-pass filter 316 of the low-pass filter unit 110 and time delay by the delay device 326 of the masking unit 114. The primary masking (leading end masking) and the secondary masking (trailing end masking) will be described hereinafter with reference to FIGS. 7 and 8A-8C.

As exemplarily shown in FIG. 7, the primary masking to remove the leading end of the high level region 508 in the current rising section is performed using a falling time difference of the first low-pass filter 312 and the second low-pass filter 316 of the low-pass filter unit 110. That is, as exemplarily shown in FIG. 7, a signal 702 having passed through the first low-pass filter 312 (waveform represented by a thin line) has a shorter falling time than a signal 704 having passed through the second low-pass filter 316 (represented by a thick line). Therefore, digitization of the signal 702 having passed through the first low-pass filter 312 via the analog-to-digital converter 112 causes only a leading end 706 of the high level region in the current rising section to be output. However, since a comparator LM393 of the analog-to-digital converter 112 serves to mask the high level region in the current rising section, a reference voltage of the analog-to-digital converter 112 may be set so as not to output the high level region due to out-of-step entry or the out-of-step state in the current chopping section.

As exemplarily shown in FIG. 8A, if the leading end 706 of the high level region in the current rising section resulting from the primary masking of FIG. 7 is delayed by the delay device 326 of the masking unit 114, a delayed signal 802 as exemplarily shown in FIG. 8B is acquired. As the delayed signal 802 passes through the second comparator 328 upon receiving a predetermined level of reference voltage 804, trailing end masking as exemplarily shown in FIG. 8C is accomplished.

FIG. 9 is a view showing a motor control method for an image forming apparatus according to an embodiment. As exemplarily shown in FIG. 9, the controller 102 of the image forming apparatus drives the motor 106 for image formation (902). During driving of the motor 106, the controller 102 detects phase current of the motor 106 via the current detector 108, and detects a voltage, the magnitude of which corresponds to the detected current (904). The controller 102 analyzes the detected voltage, and detects the operating state of the motor 106 based on the analyzed result (906). In this case, the controller 102 detects the normal state of the motor 106, out-of-step entry, and the out-of-step state of the motor via the motor state detector 120 as exemplarily shown in FIG. 3.

If the motor 106 is in the normal state ("Yes" in Operation 908), the controller 102 returns to Operation 904 to detect current of the motor 106, and continuously detects the current and operating state of the motor 106. Conversely, if the motor 106 is not in the normal state (i.e. out-of-step entry or the out-of-state of the motor 106) ("No" in Operation 908), the controller 102 judges whether or not the current state is out-of-step entry (910). If out-of-step entry is judged ("Yes" in Operation 910), the controller 102 controls peak current of the motor 106 to return the motor 106 from out-of-step entry to the normal state (912). In this case, the controller 102 raises peak current of the motor 106 to a predetermined value. Since out-of-step of the motor 106 frequently causes supply of less current than load, raising the peak current ensures that current corresponding to load is supplied to the motor 106. In addition, the controller 102 repeatedly performs the peak current control a preset number of times (for example, n times). If the motor 106 gets out-of-step despite the repeated peak current control ("Yes" in Operation 914), the controller 102 stops driving of the motor 106 and outputs an alarm through the alarm output unit 118 to allow the user to recognize out-of-step of the motor 106 (916). If the motor 106 is returned to the normal state rather than getting out-of-step owing to the peak current control of n times ("No" in Operation 914), the controller 102 normalizes the peak current to continuously drive the motor 106 (918).

As is apparent from the above description, according to one aspect, by detecting out-of-step of a motor using only an electric circuit configuration without additional mechanical devices, such as an encoder, a light-emitting device, and a light-receiving device, it may be possible to detect the state of the motor and to predict out-of-step of the motor, which may prevent the motor from getting out-of-step and may provide a user with an alarm with regard to out-of-step of the motor.

Although embodiments have been shown and described, it would be appreciated by those skilled in the art that changes may be made in these embodiments without departing from the principles and spirit of the disclosure, the scope of which is defined in the claims and their equivalents.

What is claimed is:

1. An image forming apparatus comprising:
   an image forming unit having a motor;
   a motor state detector that acquires a current detection signal by detecting phase current of the motor and that generates an output signal in which a duty ratio in a current chopping section of the current detection signal is included;
   a masking unit that removes a motor phase-current rising section from the current detection signal; and
   a controller that judges a normal state, out-of-step entry, and an out-of-step state of the motor based on the output signal of the masking unit, and that raises peak current of the motor if out-of-step entry of the motor is judged.

2. The apparatus according to claim 1, wherein:
   the controller judges the normal state of the motor if the duty ratio in the current chopping section of the current detection signal is reduced;
   the controller judges out-of-step entry of the motor if the duty ratio in the current chopping section of the current detection signal is increased; and
   the controller judges the out-of-step state of the motor if the duty ratio in the current chopping section of the current detection signal maintains a constant value.

3. The apparatus according to claim 2, wherein the controller outputs an alarm indicating out-of-step of the motor if the out-of-step state of the motor is judged.

4. The apparatus according to claim 1, wherein the controller repeatedly raises the peak current of the motor a preset number of times when the motor gets out-of-step.

5. The apparatus according to claim 1, wherein the motor includes a constant-current control type stepper motor.

6. An image forming apparatus comprising:
   a motor;
   a current detector that detects phase current of the motor and generates a current detection signal representing the detected phase current of the motor;
   a low-pass filter unit that performs low-pass filtering to convert the current detection signal into a direct-current (DC) voltage level;
   an analog-to-digital converter that converts the low-pass filtered current detection signal into a digital signal;
   a masking unit that removes a motor phase-current rising section from the digitized current detection signal and that generates an output signal representing information on the state of the motor in which a duty ratio in a current chopping section of the digitized current detection signal is included; and
   a controller that judges a normal state, out-of-step entry, and an out-of-step state of the motor based on the output signal of the masking unit, and that raises peak current of the motor if out-of-step entry of the motor is judged.

7. The apparatus according to claim 6, wherein the low-pass filter unit includes:
   a first low-pass filter that performs low-pass filtering of the current detection signal;

an amplifier that amplifies an output signal of the first low-pass filter; and a second low-pass filter that performs additional low-pass filtering of the signal amplified by the amplifier and that outputs the resulting signal to the analog-to-digital converter.

8. The apparatus according to claim 7, wherein the masking unit includes:

a first comparator that compares an output of the amplifier of the low-pass filter unit with a preset reference voltage and that outputs a digitized binary signal based on the comparison result;

a delay device that delays an output of the first comparator;

a second comparator that compares an output of the delay device with a preset reference voltage and that outputs a digitized binary signal based on the comparison result; and a logic device that performs a logic operation of the output signal of the analog-to-digital converter, the output signal of the first comparator, and the output signal of the second comparator, to eliminate a current rising section and output only a signal representing a duty ratio of the current chopping section.

9. The apparatus according to claim 6, wherein the controller judges the normal state of the motor if the duty ratio in the current chopping section of the current detection signal is reduced;

the controller judges out-of-step entry of the motor if the duty ratio in the current chopping section of the current detection signal is increased; and the controller judges the out-of-step state of the motor if the duty ratio in the current chopping section of the current detection signal maintains a constant value.

10. The apparatus according to claim 6, wherein the controller repeatedly raises the peak current of the motor a preset number of times when the motor gets out-of-step.

11. The apparatus according to claim 6, wherein the controller outputs an alarm indicating out-of-step of the motor if the out-of-step state of the motor is judged.

12. The apparatus according to claim 6, wherein the motor includes a constant-current control type stepper motor.

13. A control method for an image forming apparatus, the method comprising:

driving a motor;

acquiring a current detection signal by detecting phase current of the driving motor using a motor state detector;

removing a motor phase-current rising section from the current detection signal using a masking unit; and judging, using a controller, a normal state, out-of-step entry, and an out-of-step state of the motor based on an output signal in which a duty ratio in a current chopping section of the current detection signal is included, and raising peak current of the motor under control if out-of-step entry of the motor is judged.

14. The method according to claim 13, wherein the normal state of the motor is judged if the duty ratio in the current chopping section of the current detection signal is reduced;

out-of-step entry of the motor is judged if the duty ratio in the current chopping section of the current detection signal is increased; and the out-of-step state of the motor is judged if the duty ratio in the current chopping section of the current detection signal maintains a constant value.

15. The method according to claim 14, further comprising outputting an alarm indicating out-of-step of the motor under control if the out-of-step state of the motor is judged.

16. The method according to claim 13, further comprising repeatedly raising the peak current of the motor a preset number of times under control when the motor gets out-of-step.

17. The method according to claim 13, wherein the motor includes a constant-current control type stepper motor.

18. A motor state detector comprising:

a current detector that detects phase current of a motor and generates a current detection signal representing the detected phase current of the motor;

a low-pass filter unit that performs low-pass filtering to convert the current detection signal into a direct-current (DC) voltage level;

an analog-to-digital converter that converts the low-pass filtered current detection signal into a digital signal; and a masking unit that removes a motor phase-current rising section from the digitized current detection signal and that generates an output signal representing information on the state of the motor in which a duty ratio in a current chopping section of the digitized current detection signal is included.

19. The detector according to claim 18, wherein the low-pass filter unit includes:

a first low-pass filter that performs low-pass filtering of the current detection signal;

an amplifier that amplifies an output signal of the first low-pass filter; and a second low-pass filter that performs additional low-pass filtering of the signal amplified by the amplifier and that outputs the resulting signal to the analog-to-digital converter.

20. The detector according to claim 19, wherein the masking unit includes:

a first comparator that compares an output of the amplifier of the low-pass filter unit with a preset reference voltage and that outputs a digitized binary signal based on the comparison result;

a delay device that delays an output of the first comparator;

a second comparator that compares an output of the delay device with a preset reference voltage and that outputs a digitized binary signal based on the comparison result; and a logic device that performs a logic operation of the output signal of the analog-to-digital converter, the output signal of the first comparator, and the output signal of the second comparator, to eliminate a current rising section and output only a signal representing a duty ratio of the current chopping section.

21. The detector according to claim 18, wherein the motor includes a constant-current control type stepper motor.

* * * * *